Nov. 25, 1969  D. D. SIMMONS  3,479,980
MULTIPURPOSE SPORT VEHICLE CHASSIS
Filed Oct. 24, 1967  5 Sheets-Sheet 1
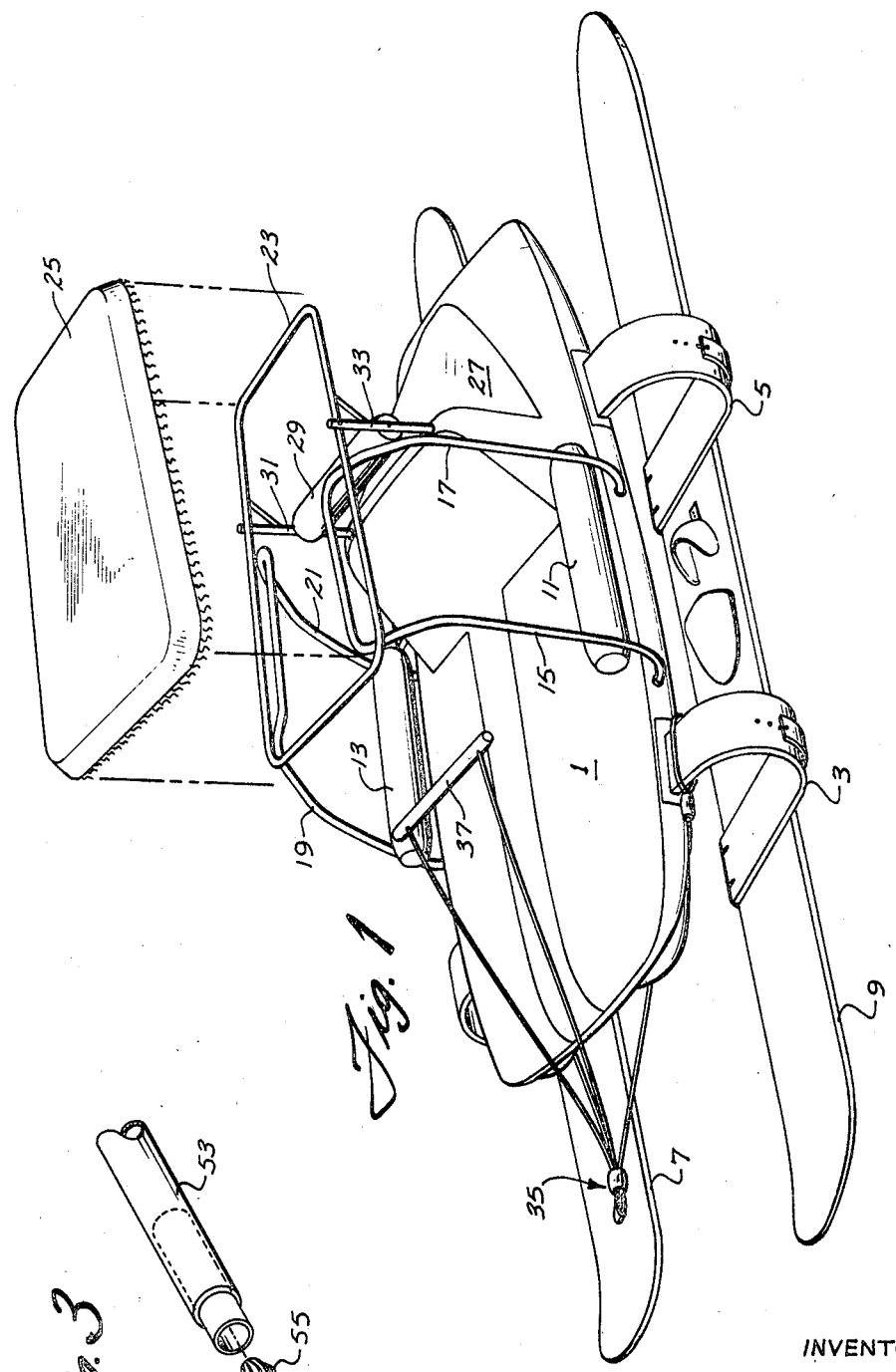
INVENTOR
DONALD D. SIMMONS
BY  D.J. Crickenberger
ATTORNEY

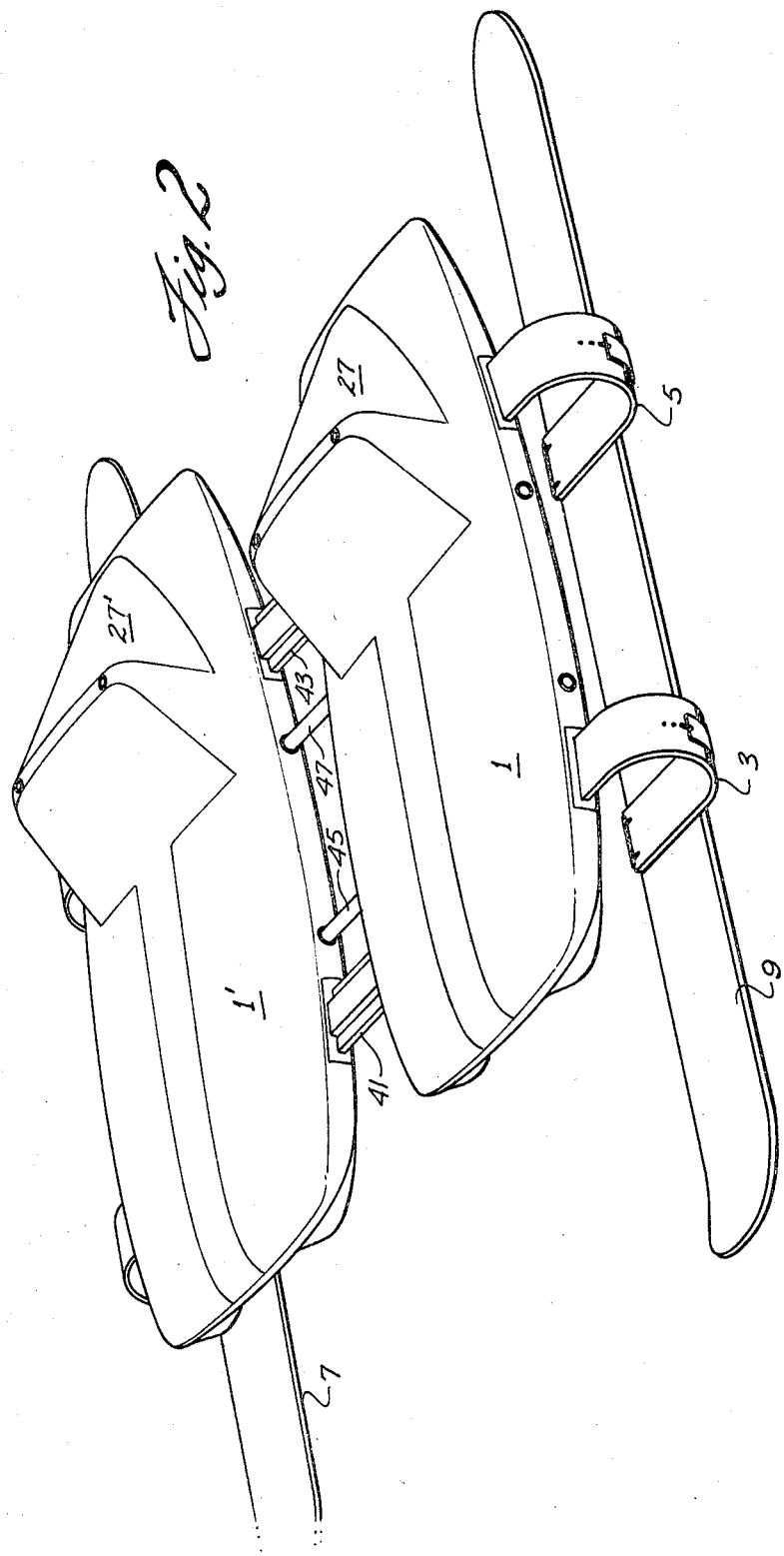

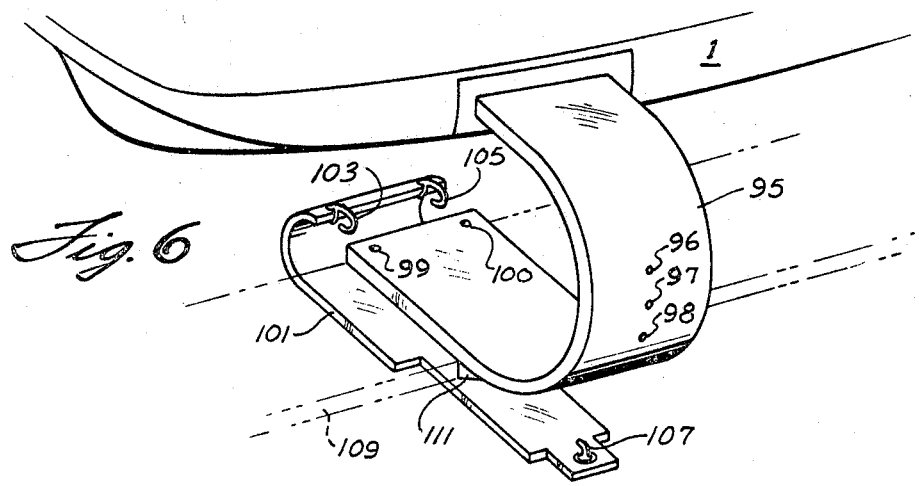
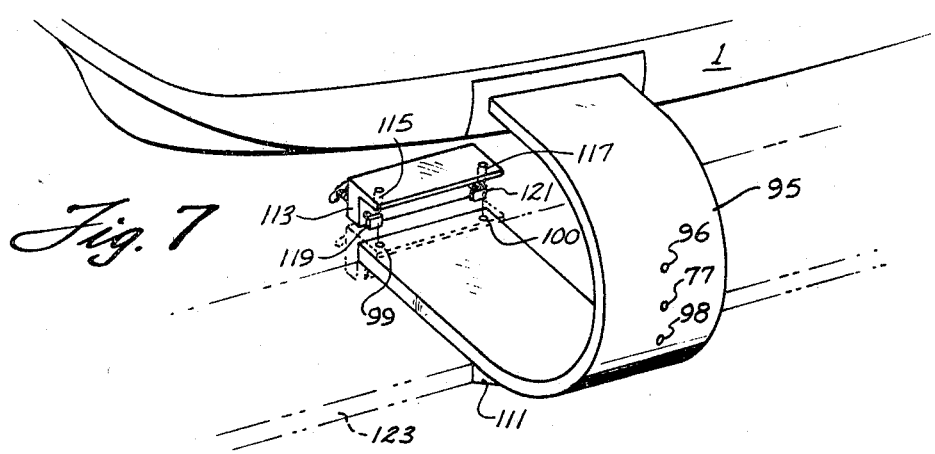
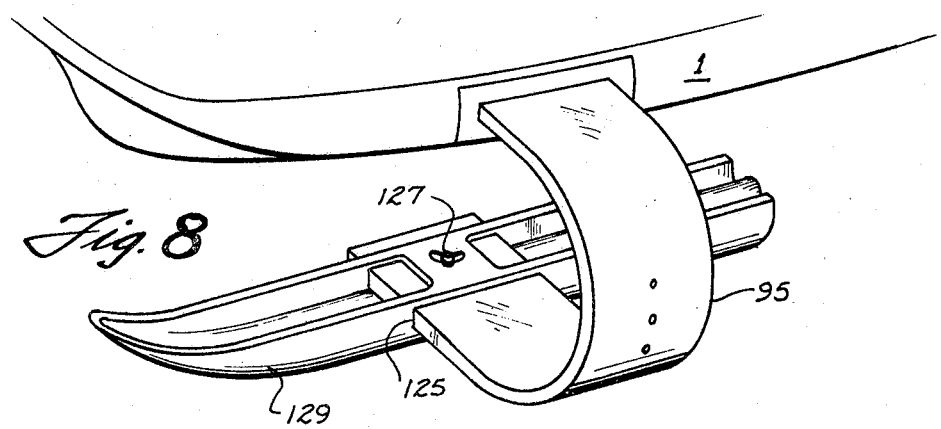

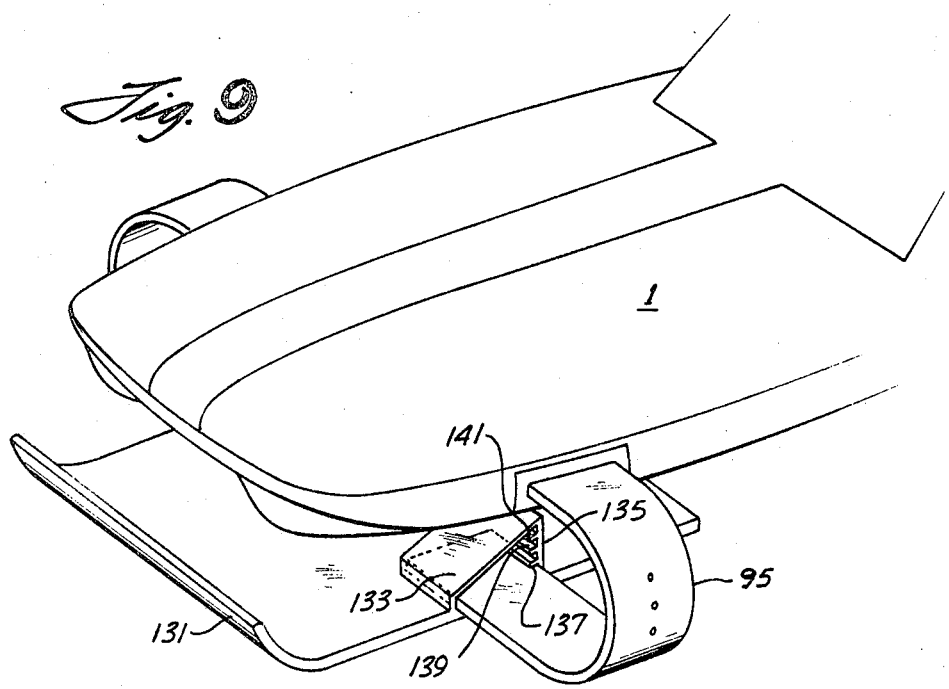
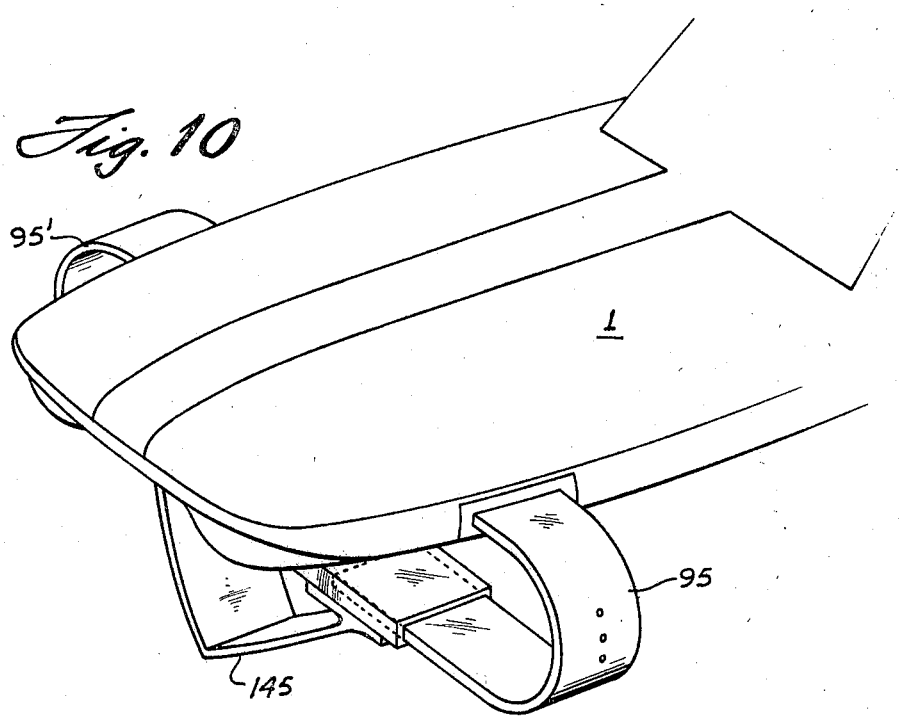

3,479,980
Patented Nov. 25, 1969

3,479,980
MULTIPURPOSE SPORT VEHICLE CHASSIS
Donald D. Simmons, 4030 Washington Blvd.,
Arlington, Va. 22201
Filed Oct. 24, 1967, Ser. No. 677,647
Int. Cl. B62b 15/00; B60f 3/00
U.S. Cl. 114—66.5                                9 Claims

ABSTRACT OF THE DISCLOSURE

A buoyant chassis adaptable for water, snow and ice sports includes a foamed-plastic main body portion with detachable supports for skis, hydroplanes, hydrofoils, toboggins and ice skates. Attachments to the body portion include a towing harnes, arm rests, a head rest and a canopy. Ready conversion is accomplished with the same chassis by changing the detachable supports to correspond to the desired sport.

Background of the invention

This invention relates to a sport vehicle chassis which provides a seat and vehicle for a sports participant to engage in a variety of sports activities with the use of certain interchangeable attachements.

Participating in sports is a pastime of ever-increasing popularity with the general public. Rapid advances in automation and the widespread use of computers have contributed to making available larger amounts of leisure time and the public has responded to this by participating in sports and recreational activities in unprecedented numbers.

Many people enjoy more than one sport and are interested in maintaining their sports activities on a year-around basis. Most sports activities involve the purchase and maintenance of various items of equipment and the cost factor thus introduced is frequently prohibitive where an individual participates in several sports. In addition to the cost involved, sports such as water skiing, snow skiing and ice skating require a degree of skill which is not acquired easily and which entails substantial risk of bodily injury. Accordingly, there is a need for a device which requires a minimum degree of skill and which may be adapted to a plurality of sports activities to enable participation with a minimum equipment cost and risk of injury.

Summary

The present invention provides a multipurpose sport vehicle chassis with interchangeable spring support members adapted to accommodate water skis, hydroplanes, hydrofoils, snow skis, toboggin runners and ice skates. The chassis is alo equipped to receive attachment supports for arm rests, a head rest and a canopy. The foamed-plastic construction of the chassis enables its use as a simple floating body support for water sports in addition to its uses as a supported vehicle structure when used with various attachements.

Brief description of the drawings

The invention will be understood more readily by referring to the drawings in which FIG. 1 is a partially-exploded perspective view of the chassis of the present invention having water skis attached thereto and various other attachements mounted thereon;

FIG. 2 is a perspective view of two chassis mounted in side-by-side relationship with a single pair of water skis attached thereto;

FIG. 3 is a perspective view showing the structural detail of a support mounting utilized;

FIG. 6 is a perspective view showing the structural detail of fastening employed with a water ski attachment;

FIG. 7 is a perspective view showing the structural detail of fastening employed with a snow ski attachment;

FIG. 8 is a perspective view showing the structural detail of fastening employed with an ice skate attachment;

FIG. 9 is a perspective view showing the structural detail of fastening employed with a hydroplane or toboggin runner attachment; and FIG. 10 is a perspective view showing the structural detail of fastening employed with a hydrofoil attachment.

Description of preferred embodiments

Figure 4:
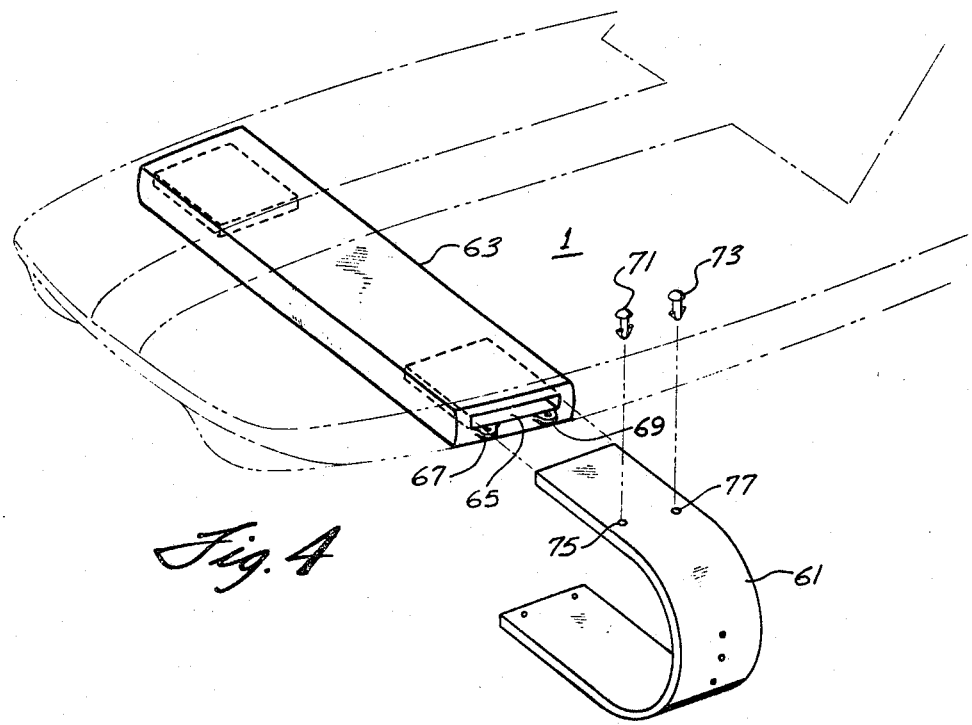
FIG. 4 is a perspective view, partially in phantom, showing one embodiment of spring support member and the means of attachment to the chassis.

The invention will be understood more readily by referring to the drawings in which FIG. 1 is a perspective view showing a vehicle chassis embodying the principles of the present invention. The chassis 1 is suitably formed of a foamed-plastic material to create a buoyant structure having a smooth impervious skin which is waterproof. Any one of a number of plastic materials commercially available is suitable for the present use, and the particular material utilized forms no part of the invention.

The left side of the chassis 1 is shown with a pair of depending spring support members 3 and 5 projecting downwardly therefrom, and another pair of spring support members (not clearly shown) depend similarly from the opposite side of the chassis. These members are constructed of spring steel of sufficient thickness to provide the desired support. The bottom portions of the spring support members do not lie in a horizontal plane, but rather form a slight angle so that the ski members 7 and 9 are angled downwardly toward each other to form a portion of a V-shape to increase the cornering stability of the vehicle when operated.

A pair of arm rest members 11 and 13 are attached to upright standard members 15, 17 and 19, 21, respectively. A rectangular tubular frame 23 is attached to standards 15, 17, 19, 21, and a canopy member 25 is disposed thereon. The canopy 25 is shown in exploded position to allow a clearer view of the remaining structural elements.

The chassis 1 has an integrally-molded back rest member 27, and mounted on the top portion of back rest member 27 is a head rest 29 which is supported by standards 31 and 33. The chassis 1 is propelled by an external source which may be connected thereto by means of harness assembly 35. Harness assembly 35 has a hand grip member 37 which may be grasped by a person in position on chassis 1 to provide additional support for the person and to give a feeling of participating more closely in the movement of the vehicle.

In FIG. 2 of the drawings a pair of the chassis members 1 and 1' are rigidly mounted together for use with a single pair of water skis 7 and 9. Brace members 41 and 43 and standards 45 and 47 interconnect the chassis 1 and 1' and hold them firmly together in locked relationship, providing the structural stability necessary for the long span between skis 7 and 9. The ends of brace members 41 and 43 are rectangular in cross-section to conform to the slots in chassis 1 in which they fit. The central portions have ridges on the tops and bottoms thereof to lend additional strength to the brace members and to serve as spacers between the two chassis.

FIG. 3 is a perspective view showing the structural detail of the mounting of the standard 51 in a receptacle 53, the receptacle 53 being integrally-molded within the chassis 1 to receive the standard 51. Standard 51 has protruding spring members 55 at one end thereof, and the diameter of spring members 55 is slightly larger than the diameter of standard 51 and larger than the interior diameter of receptacle 53. This insures a tight friction fit of standard 51 within receptacle 53 at all times.

FIG. 4 is a perspective view showing one embodiment of a spring support member 61 and the means for attaching it to chassis 1. Molded integrally with chassis 1 is a metallic cross-piece 63 which terminates at the outer surface of chassis 1 on either side thereof. Each end of cross-piece 63 has a slot 65 located therein. The dimensions of this rectangular slot 65 are substantially the same as the cross-section dimensions of spring support 61, whereby spring support 61 forms a snug, but sliding, fit therein. A pair of projecting bosses 67 and 69 have holes bored therethrough. Locking pins 71 and 73 are inserted through holes 75 and 77 of spring support member 61, as holes 75 and 77 are aligned over the holes in bosses 67 and 69. In this fashion the spring support 61 is securely locked in position on chassis 1.

Figure 5:
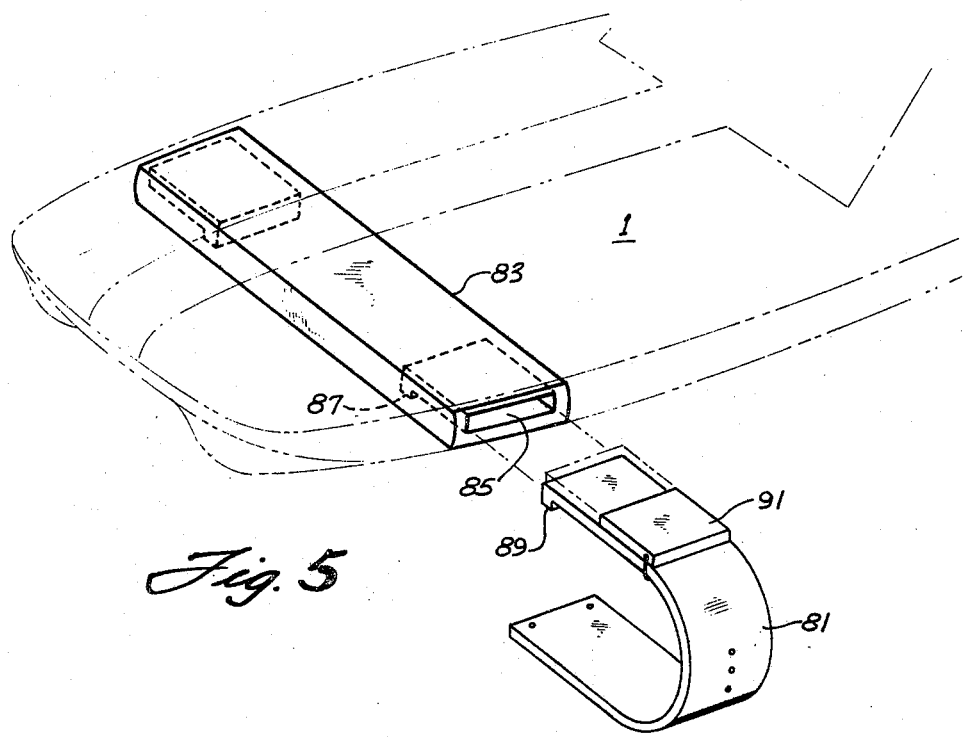
FIG. 5 is a perspective view, partially in phantom, showing a second embodiment of spring support member and the means of attachment to the chassis.

FIG. 5 is a perspective view of a second embodiment of spring support member 81. In this embodiment cross-piece 83 has a rectangular slot 85 in each end thereof. Slot 85 terminates in a depending recess 87. Spring support 81 has a depending lip 89 on the upper portion thereof. The cross-sectional dimensions of slot 85 are such that the slot height is approximately the same dimension as the combined thicknesses of support member 81 and locking block 91. Spring support member 81 is inserted in slot 85 so that the lip 89 is seated in the depending recess 87 at the bottom of slot 85. Locking block 91 is then forced into slot 85 where it wedges lip 89 all the way into recess 87 so that the support 81 is firmly locked against removal.

FIG. 6 is a perspective view showing the structural detail of fastening employed with a water ski attachment. The spring support member 95 has a plurality of holes 96, 97, 98, 99, and 100 therein. A flexible band 101 has hooks 103 and 105 on one end thereof and a single hook 107 on the other end thereof. The flexible band is passed under ski 109 (shown in phantom), and hooks 103 and 105 are passed through holes 99 and 100, respectively. Hook 107 is placed in one of the holes 96, 97 or 98, in accordance with the dimensions of ski member 109 and the adjustment desired. A downwardly projecting rib member 111 is provided on the underside of spring support member 95 to position ski 109 and assist in holding the ski firmly in place.

FIG. 7 is a perspective view showing the structural detail of fastening employed with a snow ski attachment. Spring support member 95 in FIG. 7 is identical to spring support member 95 in FIG. 6. A clamp block 113 is shown in exploded position above the lower portion of spring support member 95, and also in phantom view in operating position. Clamp block 113 has depending pins 115 and 117 which fit into holes 99 and 100, thereby locking clamp block 113 in position. Adjustable screws 119 and 121 are provided to be forced against the side of ski 123, thereby urging ski 123 against rib 111. The side pressure of screws 119 and 121 and the downward weight of the chassis 1 combined to hold the ski 123 firmly in position.

FIG. 8 is a perspective view showing an ice skate attachment to spring support member 95, which is identical to spring support member 95 shown in FIGS. 6 and 7. The ice skate attachment is provided with a rectangular recess 125 through which spring support member 95 is passed as shown in FIG. 8. An adjustable wing nut 127 located in the central portion of ice skate attachment 129 may be tightened and forced against the lower portion of spring support member 95 to anchor securely the ice skate attachment 129 in position thereon.

FIG. 9 is a perspective view showing the structural detail of fastening employed with a hydroplane or toboggin runner attachment. The planing element 131, which may be a hydroplane device or toboggin runner, has attached to either edge thereof a housing 133 which is triangular in cross-section. The upstanding leg 135 of the triangular housing has a plurality of ribs 137, 139, an 141 which form slots therebetween of a width adapted to receive an edge portion of spring support member 95. By properly selecting the slot into which spring support member 95 is inserted, the forward angle of planing member 131 may be adjusted as desired. When the device is used as a toboggin runner for snow on land, planing element 131 is placed in a substantially flat position, as shown. When the planing element 131 is used on water as a hydroplane device, spring support member 95 is inserted into one of the upper slots to produce the desired angle for hydroplaning. No form of locking pins or other device is necessary in this arrangement because the spring support members from both sides hold the planing element 131 securely therebetween.

FIG. 10 is a perspective view showing the structural detail of fastening employed with a hydrofoil attachment. The hydrofoil element 145 is held in position on the underside of chassis 1 by spring support members 95 and 95′ which fit into open recesses on either end of the upper surface of hydrofoil 145. No further means of fastening is necessary.

It will be appreciated from the foregoing description that the present invention has provided a sport vehicle chassis adaptable to a wide variety of winter and summer sports with a minimum of equipment necessary. The water and snow skis used with the chassis may be any conventional skis obtainable. The chassis may be used by itself without any attachments as a floating body or surf board device, and may be combined with one or more other chassis devices using the means of attachment shown in FIG. 2. Any one or more of the attachments such as canopy, head rest, or arm rests may be utilized in accordance with the preference of the user.

While the invention has been shown and described with particular reference to certain preferred embodiments, it will be understood by those skilled in the art that various changes in form and details may be made without departing from the spirit and scope of the invention.

What is claimed is:
1. A multipurpose sport vehicle adaptable for water, snow and ice sports comprising
   a buoyant chassis of foamed plastic,
      said chassis having waterproof smooth impervious skin,
   a plurality of flat spring support members curved about an axis parallel to the longitudinal axis of said vehicle and removably fixed to said chassis, and
   surface engaging means detachably mounted on said spring support members,
   whereby said surface engaging means can be removed and replaced to correspond to a particular surface as the surfaces over which the vehicle is slidably operated are changed.

2. The combination according to claim 1 wherein said surface engaging means comprise a pair of skis.

3. The combination according to claim 1 wherein said surface engaging means comprises a hydroplane member.

4. The combination according to claim 1 wherein said surface engaging means comprises a hydrofoil member.

5. The combination according to claim 1 wherein said surface engaging means comprises a toboggin runner.

6. The combination according to claim 1 wherein said surface engaging means comprise ice skates.

7. The combination according to claim 1 wherein a pair of said chassis are held together in side-by-side relationship.

8. The combination according to claim 1 comprising a harness assembly attached to said chassis for connection to an external source of motive power.

9. A multipurpose sport vehicle adaptable for water, snow and ice sports comprising
a chassis,
support members removably attached to said chassis,
surface engaging means detachably mounted on said support members,
   whereby said surface engaging means can be removed and replaced to correspond to a particular surface as the surfaces over which the vehicle is slidably operated are changed,
a canopy detachably supported in position over said chassis,
a back rest portion integrally formed in said chassis, and
support means for the head and arms of a user detachably mounted on said chassis.

References Cited

UNITED STATES PATENTS

| | | | |
|---|---|---|---|
| 1,179,014 | 4/1916 | Lyall | 115—1 |
| 2,238,464 | 4/1941 | Fletcher | 114—43 XR |
| 2,492,965 | 3/1950 | Carr. | |
| 3,164,119 | 1/1965 | Emmanuel et al. | 114—66.5 |

ANDREW H. FARRELL, Primary Examiner

U.S. Cl. X.R.

115—1; 280—12